Dec. 24, 1940. E. E. WHITE 2,225,676
FISHING LURE
Filed Feb. 27, 1939
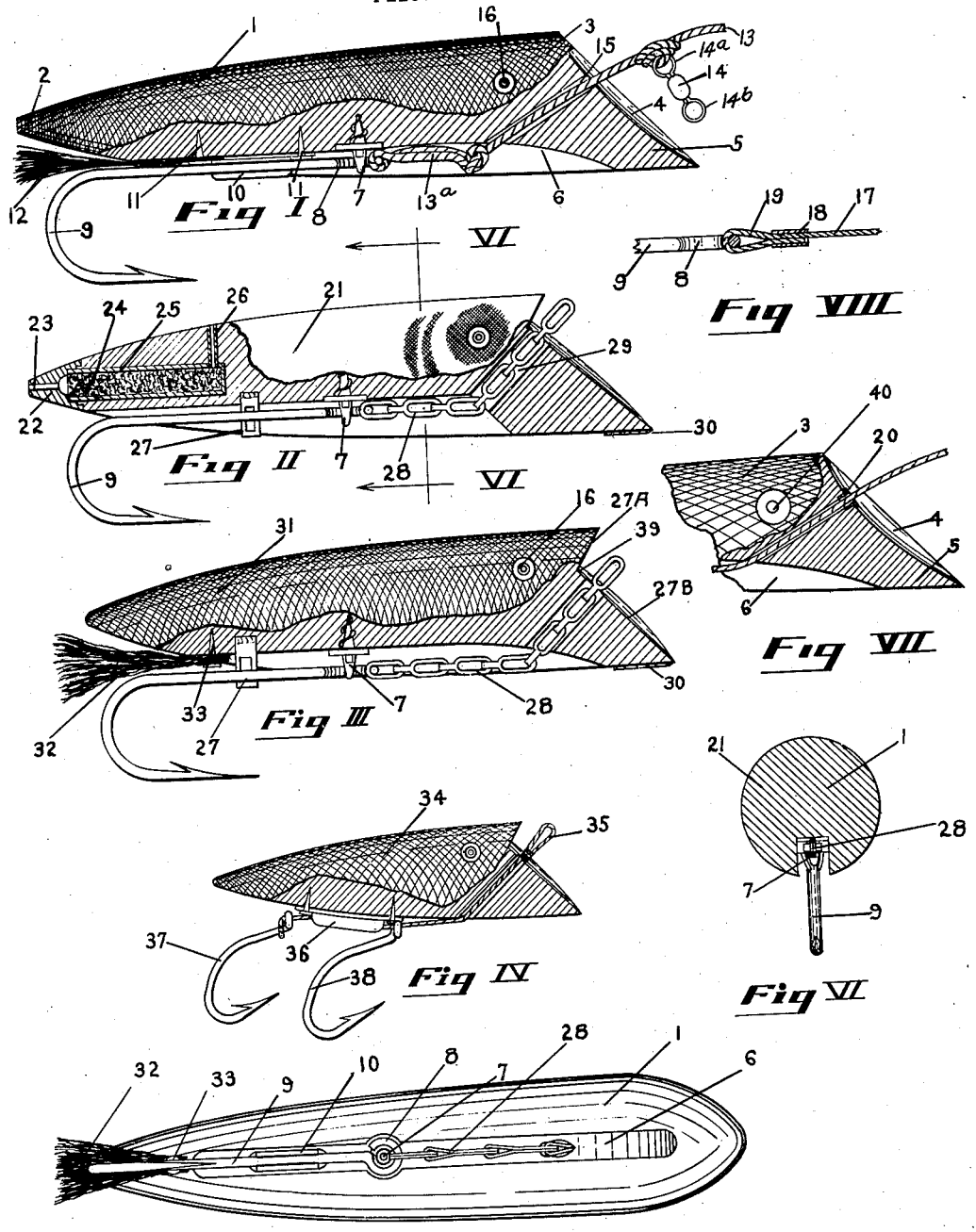
INVENTOR
Ellis E. White
BY
ATTORNEY Patented Dec. 24, 1940

2,225,676

UNITED STATES PATENT OFFICE 2,225,676

FISHING LURE

Ellis E. White, Portland, Oreg.

Application February 27, 1939, Serial No. 258,786

4 Claims. (Cl. 43—46)

My invention relates to fishing lures used by fishermen and characterized by the fact that the body element is made to simulate the appearance of a fish.

A hook and leader is associated with the lure with means being provided for maintaining the hook in a favorable position for a catch and having a trip associated therewith so that the lure and the hook may be disengaged when the catch is made. The body of the lure is made of a relatively light weight material to aid in its buoyancy and I provide a well within the body of the lure that is filled with an absorbent material which may be permeated with an aromatic material to entice the fish to the lure by the aromatic material.

The forward or head end of the lure is shaped to stabilize the lure in water and to offer resistance to its movement through water. A fibrous material is disposed at the tail of the lure to simulate a fin. Artificial eyes are provided on either side of the lure and the body of the lure is decorated to simulate a minnow.

One of the objects of my invention consists in providing a lure to which a hook is positioned and secured thereto but which becomes disengaged from the lure but not from the leader when a strike is made.

A further object of my invention consists in so constructing the lure that an aromatic material may be released from the lure into the water so that the lure may be used in normal fishing operations.

A further object of my invention consists in so constructing the lure that it is rugged and durable and is one in which the hook and leader may be attached with facility and in which the lure will have a long and useful life with practical freedom from operating annoyances.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

Fig. I is a side elevation, partly in section, showing one form of the lure of this invention and the manner of mounting the hook and the connection of the cord to the hook;

Fig. II is a side elevation of a modification of the lure of this invention, showing a chain connected to the hook and means for venting a substance to attract fish;

Fig. III is a view similar to Fig. II but somewhat enlarged and illustrating the use of a fibrous trailing substance at the hook end of the lure;

Fig. IV is a side elevation, partly in section, of a further modification showing two hooks connected to the cord;

Fig. V is a view of the bottom of the lure shown in Fig. III, looking upward;

Fig. VI is a vertical sectional view taken on the line 6—6 of Fig. II;

Fig. VII is a fragmentary view of the forward end of the lure shown in Fig. I, illustrating the use of the thimble or eyelet through which the cord leader extends; and Fig. VIII is a fragmentary view illustrating one arrangement for attaching a cord leader to the hook eyelet.

1 is the body of the lure which is made of any suitable material. I have found satisfactory results to be obtained where the body of the lure is made of wood or other material that is lighter than the medium in which it floats whether the same is salt water or fresh water.

I provide the body larger in cross sectional area at its leading end than it is at its trailing end of conical cross section with the trailing end 2 being of smallest diameter and the leading end 3 being in greatest diameter.

In order that the same may be made to simulate a fish and at the same time to become submerged as the same is drawn through the water, I taper the forward end as illustrated at 4 to thereby create a lip 5 at its leading lower end.

The water flowing over the inclined surface 4 causes the same to automatically submerge itself when being drawn through the water. I provide a slit 6 on the underside of the body. This provides a suitable channel for the shank of the hook 9 being placed therein. A locking post 7 is disposed and secured to the body 1 downwardly extends and is disposed central of the channel 6. This normally maintains the hook in the position as illustrated in Figs. I, II and III.

The eye of the hook is shown at 8 and any suitable fastening may be secured thereto whether it be a fishline, chain, leader or the like.

A second clamping device 10 is provided to which the shank of the hook engages. Thus the post 7 passes through the eye of the hook to maintain the same in position and the clasp 10 is utilized for maintaining the hook in placement.

The clasp is secured to the body 1 by suitable means such as tacks 11. It may be found desirable to make the post 7 having a screw end in order to facilitate its being screwed into the body 1 of the lure. In order to increase the efficiency of the lure I provide a suitable trailing lure 12 at the trailing end and I place the same on the underside of the body 1. The same may be made of feathers, hair or other fibrous material.

I provide a hole 15 through the enlarged end of the body 1. The hole 15 communicates the sloping and the large end of the body element with the channel 6 and I provide a loop 13ª in the cord 13 passing through to the hole 15 to facilitate its being attached to the eye of the hook.

A suitable connection for a fishing line may be made with the connection 13 by a turnbuckle 14. The turnbuckle 14 has at one end an eyelet 14ª to which the connection 13 is secured and has an eyelet 14ᵇ at its opposite end to which a fishing line may be attached. Eyes 16 are placed at the opposite sides and immediately trailing the leading end of the body 1.

A leader may be more precisely fitted to the eye of the hook by the mechanism illustrated in Fig. VIII in which the leader is shown at 17 with an eye 19 formed therein and with a thimble 18 being made to precisely fit and to be clamped upon the leader and the end of the loop that is formed therein. This makes a precise fit and will cause less disturbance when the leader and lure are pulled through the water.

Where the leader is drawn through the outer end of the body element 1 as through the inclined surface 4, a thimble 20 is provided. The thimble has a rounded outer end where the leader passes therethrough to prevent the abrading of the leader in its being slid through the thimble.

The outer exterior of the body 1 may be left plain as illustrated at 21 or it may be configurated upon the exterior in a variety of ways. Where it is left plain as illustrated at 21 considerable flash may be given to the body by silvering it or by giving it a high polish or high luster in the finish. For certain classes of fish better results are obtained where the body is treated to give it a fin like appearance as illustrated at 31 or at 34.

In order to increase the efficiency of the lure and to confine an odor within the body of the lure, I provide a removable end 22 upon the trailing end of the lure and provide a venting hole 23 therein. I place a tube 25 within the body of the lure and fill the same with any suitable absorbent carrier as fiber, or other material as illustrated at 24.

I communicate the tube 25 with the exterior of the body of the lure through the tube 26. The filler material 24 is saturated with fish oil or other suitable aromatic oil or substance that is released through the vent 26 and through the vent 23 to attract the fish to be caught through the odor released from the lure.

Where a limited wobble is permitted to occur within the barbed end of the body 9 within the hook, I provide a relatively narrow locator clamp 27. This permits a limited movement of the barbed end of the hook when being carried along by the lure itself.

In order to increase the activity of the lure when being used for certain characters of fish, I form a forward overhanging nose 27A upon the forward end of the lure which forms an obtuse angle between the face of the nose and the face 27B, each being disposed upon the forward or leading end of the lure. When a relatively large hook is being used and large fish are being angled for, I make a hole 29 within the forward end of the body of the lure 1 through which a chain or other suitable linked members 28 is led in advance of the same being attached to the eye of the hook.

Where the lures are to be used in stoney creeks or lake beds having a rough bottom, I reinforce the underside of the forward end of the lure 1 with any metallic plate 30. The fibrous material as illustrated at 12 in Fig. VI has a change in location in Fig. III and is illustrated at 32 with a fastening securing the same in place being illustrated at 33.

Where smaller fish are being angled for, the body of the lure may be made as illustrated in Fig. IV and when so made a loop 35 is disposed within the leader that passes through the forward end of the body 34 and a plurality of hooks here shown as two in number at 37 and 38 are spaced apart along the leader and are fixedly secured thereto.

A locking clamp 36 is secured to the under side of the body of the lure for maintaining the hooks in raised position. The meeting point of the two surfaces 27A and 27B meet below the top of the body of the lure at a point as illustrated at 39 and a socket 40 is formed within the body 1 of the lure into which the eyes may be positioned so that the same do not project unduly beyond the confines of the shell of the lure.

It will be noted in the various views herein shown that clamping devices are provided for maintaining the hooks and the shank of the hook, particularly in fixed relation to that of the body of the lure, but when a fish is caught the shank of the hook is disengaged from the clamp disposed upon the body of the lure so that the lure then swings independently of the hook and greater freedom is encountered in the handling of the fish after the same is caught without undue interference with that of the body of the lure.

While the form of mechanism herein shown and described is admirably adapted to fulfill the objects primarily stated, it is to be understood that it is not intended to confine the invention to the one embodiment herein shown and described, as it is susceptible of embodiment in various forms, all coming within the scope of the claims which follow.

What I claim is:

1. In a device of the class described, in combination, a body tapered rearwardly from its front end, the front end of the body having a shape which causes the body to submerge when being drawn through the water, a leader receiving hole extending from the front end to the bottom of the body, a slit disposed in the bottom of the body and into which the leader receiving hole terminates, said slit being shaped to receive the shank of a hook, a fish hook, and means associated with the slit to hold a fish hook in normal position but which facilitates the disengagement of the hook therefrom when the hook is engaged by a fish.

2. A fish lure comprised of a body which simulates a fish, artificial eyes disposed at either side of the front end of the body, the front end of the body being shaped to cause a submergence of the lure when the lure is drawn through the water, a slit longitudinally disposed in the bottom of the body, a leader receiving hole extending through the body of the front and terminating within the slit disposed in the bottom of the body, a fish hook, and means for maintaining the shank of the hook within the slit when the lure is being used in fishing but which becomes disengaged from the slit when a strike is made.

3. A fisherman's lure, comprising of a body which simulates a fish, the head end of said body being fashioned to cause submergence of the lure when it is being drawn through the water, a slit extending longitudinally of the under side of the body, a leader, a leader receiving hole connecting the slit with the front end of the body and terminating well above the bottom edge of the front end of the body, a fish hook secured to the body, and means for normally maintaining the shank of the hook within the slit during normal fishing.

4. A fisherman's lure comprised of a body which simulates a fish, the head end of the body sloping rearwardly from the bottom toward the top, a slit longitudinally disposed within the bottom of the body, a leader hole in the body and having its lower end continuous with said slit, a leader disposed therein, a hook, said hook being secured to the leader, and means for maintaining the shank of the hook within the slit during normal fishing.

ELLIS E. WHITE.